United States Patent [19]

Ross

[11] 4,281,700
[45] Aug. 4, 1981

[54] RUN-FLAT VEHICLE TIRE

[75] Inventor: William C. Ross, Winchester, Mass.

[73] Assignee: W. R. Grace & Co., Cambridge, Mass.

[21] Appl. No.: 108,891

[22] Filed: Dec. 31, 1979

Related U.S. Application Data

[60] Division of Ser. No. 33,679, Apr. 26, 1979, which is a continuation-in-part of Ser. No. 7,068, Jan. 29, 1979, abandoned.

[51] Int. Cl.³ ............................................. B60C 17/04
[52] U.S. Cl. .................................. 152/158; 152/313; 152/330 RF
[58] Field of Search ............... 152/151, 155, 158, 246, 152/310, 311, 312, 314, 330 R, 313, 330 RF, 331, 339, 340; 156/110 R, 117, 169, 173, 175; 428/36, 105, 107, 109, 192

[56] References Cited

U.S. PATENT DOCUMENTS

| 2,844,180 | 7/1958 | Omeron | 152/158 |
|---|---|---|---|
| 2,989,108 | 6/1961 | Gore | 152/158 |
| 3,568,286 | 3/1971 | Ross | 29/121 |
| 3,730,244 | 5/1973 | Ross | 152/323 |
| 3,730,794 | 5/1973 | Ross | 156/112 |
| 3,814,158 | 6/1974 | Ryder | 152/158 |
| 3,942,571 | 3/1976 | Kraft | 152/158 |
| 3,990,491 | 11/1976 | Hampshire | 152/158 |
| 4,008,743 | 2/1977 | Welch | 152/158 |
| 4,121,640 | 10/1978 | Henning et al. | 152/340 |
| 4,137,894 | 2/1979 | Gardner et al. | 152/330 RF |
| 4,153,095 | 5/1979 | Sarkissian | 152/340 |
| 4,177,848 | 12/1979 | Van der Burg | 152/158 |
| 4,183,388 | 1/1980 | Cassidy | 152/158 |

OTHER PUBLICATIONS

"Progress in Urethane Tire Filling" from Rubber World, May 1976, by Ransome J. Wyman.

Primary Examiner—John E. Kittle
Attorney, Agent, or Firm—C. Edward Parker; William L. Baker

[57] ABSTRACT

An insert to provide a run-flat capability to pneumatic vehicle tires comprises a flexible, compressible, porous ring comprised of a plurality of successively-wound, circumferential layers of an elastomeric binder-coated filamentary material, the coated filaments having voids therebetween and being bonded to one another by the binder. The insert has desirable properties including lightweight, flexibility, and good load-distributing properties which make it a practical and useful component of any run-flat insert design for pneumatic tires. In preferred embodiments, the insert is spaced and supported from the tire by a member which minimizes the overall weight added to the tire. It is also further desirable to provide the insert with means to reduce its expansion radially upon rotation of the tire.

35 Claims, 16 Drawing Figures

RUN-FLAT VEHICLE TIRE

This is a division of application Ser. No. 033,679 filed Apr. 26, 1979, which is a continuation in part of U.S. Ser. No. 007,068, filed Jan. 29, 1979, now abandoned.

BACKGROUND OF THE INVENTION

This invention relates to tire and wheel assemblies for vehicles and more particularly to pneumatic tire and wheel assemblies having run flat capabilities.

Pneumatic vehicle tires in conventional use offer good riding characteristics and are light in weight but suffer the drawback of becoming inoperative as a practical matter upon loss of air. Such loss of operability is not only undesirable from the safety standpoint, but also requires that an additional tire be carried by the vehicle as a precaution against the loss of air from an operating tire. The additional tire however adds weight and takes up available space and is therefore highly undesirable particularly to present day automobile manufacturers who are seeking to reduce size and weight of automobiles in order to meet more stringent government fuel economy requirements for their vehicles as well as safety requirements.

An ideal solution to the problem of inoperativeness upon loss of air from pneumatic tires is to impart a "run flat" capability to the tire which would permit the tire to continue to be operative for at least a reasonable period of time following deflation. A popular approach to imparting a run flat capability to pneumatic tires is to provide some sort of inner annular member within the tire having sufficient resiliency to prevent complete collapse of the tire tread wall upon deflation. Thus for example metallic or other rigid material annular extensions to the tire rim have been suggested which extend into the air chamber of the tire a distance but stop short of the tire tread wall in order to preserve the good ride of the pneumatic tire. The metal extensions typically act to support the tread wall and sometimes also to hold the tire beads in place upon deflation of the tire. Metal extensions however add considerable weight to the wheel assembly and offer poor riding characteristics in the run flat condition due to the rigidity of the extension itself. Also, special rim designs are usually required with such extensions such as for example is shown in U.S. Pat. No. 2,844,180 to Omeron. More recent advancements in this area are shown for example in U.S. Pat. Nos. 3,942,571 to Kraft and 3,990,491 to Hampshire and Watts, where the metallic extension is C-shaped in cross section to lessen its rigidity and is further shaped such that it can be used with the conventional one piece drop-center tire rim. Inner annular members of less rigid material than metal such as for example foamed polymer inserts have also been suggested in the art. Such inserts might improve run flat riding characteristics but generally they suffer from lack of adequate dimensional stability and high heat build-up which are especially important considerations when the tire is to be driven in a run flat condition a lengthy distance and/or at the relatively high rates of speed required in modern highway driving. Also, due to the high volume occupied by typical foam polymer inserts, use of such materials with conventional one piece rims is limited since sufficient space must be left within the tire cavity to permit mounting of the tire. One example of a foamed polymeric insert said to be mountable upon a conventional one piece tire rim is shown in U.S. Pat. No. 3,814,158 to Ryder. The foamed polyurethane insert shown in this patent has a pair of annularly extending bead wires to add structural stability and support and further has a central annular space to permit collapse of the insert during mounting of the tire upon a conventional one piece drop center rim. More recently published patents in the area of run-flat inserts for pneumatic tires include U.S. Pat. No. 4,121,640 to Henning et al and U.S. Pat. No. 4,137,894 to Gardner et al, which make use of an insert comprised generally of an inner pneumatic member of smaller diameter than the tire which supports the tire carcass when the tire is operating in the run-flat condition.

BRIEF SUMMARY OF THE INVENTION

In my U.S. Pat. Nos. 3,568,286; 3,730,244 and 3,730,794 there is described a novel resilient, volume-compressible product made by winding a plurality of layers of an essentially continuous elastomeric binder coated filament or filaments upon a core in a manner such that the coated filaments connect substantially only at their crossover points and void spaces are left in the finished product. As mentioned in these patents, the products are useful in the construction of printing rollers or in the construction of blow-out proof vehicle tires made by winding the filaments in successive layers upon a tire rim and coating with tread compound, or by winding upon a mandrel, removing the wound body from the mandrel, and inserting into a conventional tire carcass. Non-pneumatic vehicle tires made according to these patents have proven in testing to be excellent vehicle tires from the standpoint of ride and structural integrity even at high speed. I have now found that a wound, volume-compressible member of the type described in my aforementioned U.S. Patents is ideally suited for use as an insert within conventional pneumatic tires to provide run-flat capability to such tires. In particular, I have found that such a member in the form of a wound, compressible, flexible ring-shaped body has properties which make it ideally suited for such use. The insert of the present invention can be made to be evenly balanced, possesses excellent structural strength, heat transfer and load distribution properties at an acceptable lightweight, yet is flexible and sufficiently compressible to afford good riding characteristics in a run-flat condition. The flexibility of the ring-shaped insert allows it to be temporarily distorted sufficiently to permit its insertion into a conventional pneumatic tire carcass, for example during initial construction and assembly of the tire or in subsequent service station handling operations. The insert of the invention can ideally be used in conjunction with any type of conventional tire rim including "one piece", "drop center" automobile tire rims. Because of its manner of manufacture, its properties such as weight and degree of compressibility can be easily varied within broad ranges to desired embodiments. The insert moreover is compressible in both the horizontal and vertical directions, and has such good load-distribution properties that it can be ideally cantilevered and used in conjunction with other materials which lessen overall weight added to the tire as discussed later. The insert can moreover be made so as to compress under local shock, such as hitting a rock, to one-half for example of its thickness without damage or the high shock which occurs when metal or solid plastic insert devices are the principal means of absorbing such shock. The inventive manner in which I make use of such valuable properties will become clear from the following detailed discussion.

DETAILED DESCRIPTION OF THE INVENTION

Figure 1:
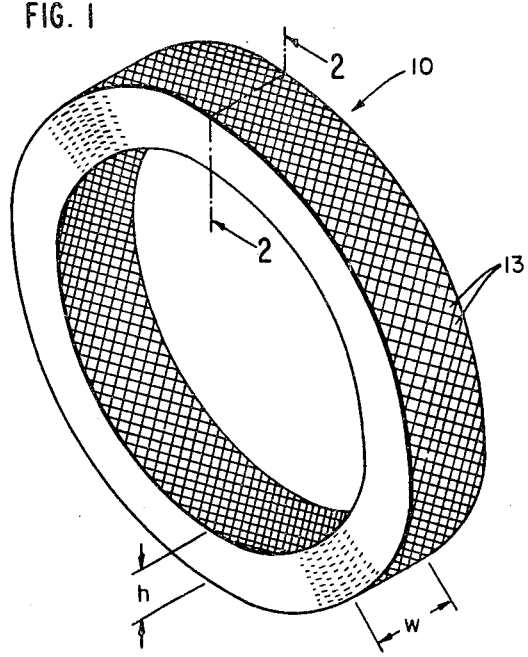
FIG. 1 is a view in perspective of a run-flat insert-ring according to the invention for use within a conventional pneumatic automobile vehicle tire (not shown); the insert having been made following the winding pattern shown in FIGS. 15 and 16.

As previously discussed, my volume-compressible, void-containing, elastomeric-binder coated filamentary product of the type described in my aforementioned patents and in the form of a ring removed from a core or mandrel upon which it is wound has been found to possess many advantageous properties rendering it useful as a run-flat insert in conventional pneumatic vehicle tires.

In my experiments and developmental work towards a practical run-flat design using such a compressible member as an insert to be contained within a conventional vehicle tire carcass, I found several factors to be of importance. The insert design should be of as little mass as possible in order to minimize the weight added to the tire, and to minimize heat buildup. Moreover, the most practical run-flat insert design is one which can be utilized in conjunction with the present conventional "one-piece", "drop-center" automobile tire rim which has an annular well into which the beads of the conventional automobile tire carcass fit during mounting of the tire.

A ring-shaped insert comprised of a mass of elastomer-coated and bound, successively-wound filamentary material of the type shown in my previous patents and having an inner diameter such that it simply rests upon the tire rim, and a height short of the treadwall of the tire carcass but sufficient to give "run-flat" operation, was found to be an undesirable design from several practical aspects. Such a body of windings was heavy, that is massive, which tends to promote heat build-up in the tire in operation. Also, such an insert positioned directly upon and supported by the rim was found not sufficiently extensible or stretchable in a radial direction from a practical standpoint to permit passage of the insert over the outer flanges of a conventional automobile tire rim. A two piece, "split" rim design was thus dictated as a practical matter in such a design. While not sufficiently stretchable to be practically installed over the rim flanges, testing of such an initial insert design moreover disclosed that such as insert because of its method of manufacture expanded in a radial direction leading to separation from the rim when the rim upon which it was mounted was revolved at high speed.

Attempts at reducing the overall mass and weight of the ring shaped body of the elastomer coated and bonded filamentary insert lead to the unexpected finding that the insert could be spaced from the rim and supported by a member or members configured and constructed such that the overall mass or weight of the total insert and spacer design could be reduced as compared to the design wherein the compressible ring simply extends to and is supported by the rim, without loss of the desirable weight distributing properties under load of the elastomer-filament ring itself. Moreover, it was found that by utilizing as such a spacer-support member, or as a part thereof, a member which itself was non-extensible in the radial direction, or at least less extensible in that direction than the ring itself, and bonding it to the body of elastomer-filamentary material, the aforementioned tendency of the body of elastomer-coated filamentary material to expand radially or circumferentially when revolved radially or circumferentially could be reduced. In a particular embodiment discussed below, such a non-extensible member positioned for example between the rim and the ring is comprised of one or more circumferential windings of filamentary material narrower in width than the insert itself which are themselves non-extensible in the radial direction, yet such windings are flexible to permit installation within the tire carcass. As discussed below, such windings are preferably comprised of a dense mass of elastomer-bonded, circumferentially wound non-extensible but flexible material.

In FIG. 1, a ring-shaped insert 10 according to the invention is shown. The insert is dimensioned overall to fit within a conventional automobile tire carcass. The insert is comprised of a volume-compressible porous mass or body made by winding successive circumferential layers of elastomer-coated filament in a pre-determined pattern on a core and bonding the elastomer at points of contact. In the embodiment shown which is designed for use in connection with a conventional 14 inch pneumatic automobile tire (that is, for mounting on a 14 inch rim), the compressible porous body or ring has a width "w" across its outer face of about $3\frac{1}{4}$ inches and a height "h" of about $2\frac{1}{4}$ inches. The outer circumference of the ring measures about 20.5 inches. The ring is thus dimensioned such that it will pass over the outer flanges of the conventional 14 inch rim and does not contact the tire carcass when the tire is in its normal inflated non-run flat condition.

The compressible porous body or ring 10 is made in accordance with the teachings of my aforementioned U.S. Patents. Thus the porous portion 10 comprises a plurality of built-up layers of a continuous filamentary material 11 coated with elastomeric binder 12 (see cross-sectional view FIG. 2). The porous portion further has a plurality of void spaces 13 therein. As disclosed in my aforementioned U.S. patents and mentioned above, such a porous compressible body can be produced by winding an elastomer-coated filamentary material upon a core in a plurality of successive layers, care being taken to leave void spaces between the filaments. The porous compressible body 10 is truly volume compressible beacuse as a load is exerted upon the body, the elastomeric binder-coated filaments will flow into the voids 13 and as a result the body will occupy a smaller space than it occupied under no load. Due to te stabilization afforded by the filamentary material 11, the body has good resistance to lateral distortion. Moreover the body has unexpectedly good uniform load distribution properties as will be discussed hereafter.

The compressible porous ring 10 is produced in general by winding the filamentary material upon a collapsible or otherwise removable core or winding drum at an angle to the horizontal axis thereof. The core or outer surface of the drum is cylindrical to give the porous portion 10 an overall uniform cylindrical or ring shape as shown in the drawings. Each successive winding in a layer does not fall directly on the underlying parallel filament in the same layer, rather it is displaced to provide the necessary void spaces and thus, adjacent filaments in the same layer do not contact each other. The filament winding is started at one end of the core and wound at a desired constant angle across the core in accordance generally with the teachings of my aforementioned U.S. Pat. Nos. 3,568,286; 3,730,244 and 3,730,794, the disclosures of which are hereby incorporated by reference.

The number of layers of filamentary material depends upon the pattern of windings employed, the diameter of the filament, the tension under which the filament is wound and the angle of the windings. The angle of winding upon the winding drum or core preferably ranges from substantially perpendicular to the horizontal axis of the drum, to an angle of about 30° (as measured between the wound filament and the horizontal axis of the drum, or conversely, to about 60° as measured between the wound filament and a perpendicular to the horizontal axis of the drum). The term "substantially perpendicular" as used herein is intended to refer to an angle deviating from a 90° angle to the horizontal axis of the drum and is intended to exclude a 90° angle. If the filaments were would at an angle perpendicular to the axis of the core, i.e., a 90° angle, then successive windings would lie directly on top of each other and the windings would not progress across the face of the core or winding drum. It is critical that the filaments be placed at an angle such that there is no contact between adjacent filaments in a layer. A preferred angle of winding lies between about 30° and 60°, e.g. 45°, as measured between the wound filament and the horizontal axis of the drum.

The closer the filaments are spaced to each other, the smaller the voids will be and the less the compressability. In a preferred embodiment, the void volume is not less than 10 percent. However, a void volume of less than 10 percent may be employed for low compressive operations. The upper limit of the void volume is determined by the unevenness of the pressure pattern which can be tolerated for the particular employment of the insert or the amount of deflection desired for the end use.

Figure 5:
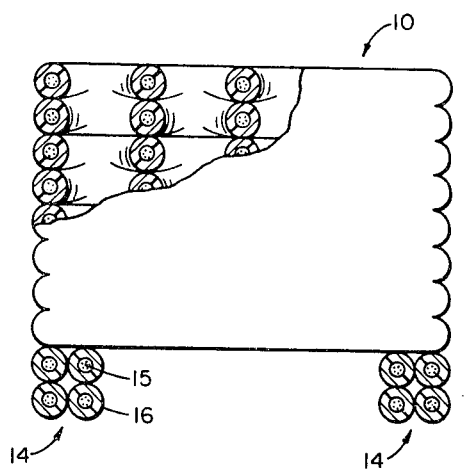
FIGS. 5 through 9 are cross-sectional views of further insert-ring designs of the invention.
Figure 6:
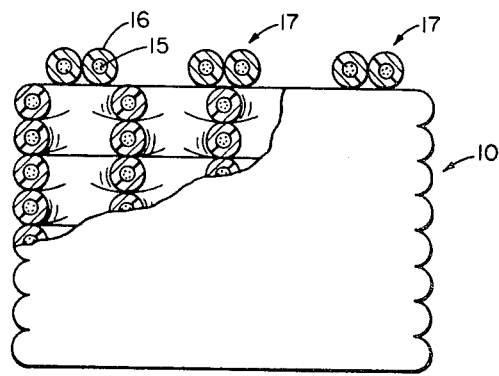

In general, any of the methods or patterns described or shown in my aforementioned U.S. Patents can be employed to produce the porous body 10 in the accompanying drawings. For example, the coated filamentary material might be wound as shown in FIG. 5 of each of my U.S. Pat. Nos. 3,730,794 and 3,568,286 leading to compressible void-containing elastomer-filament bodies shown as 13 in FIG. 1 of each of my U.S. Pat. Nos. 3,730,794 and 3,568,286. In this method the coated filament is first wound at a constant angle a number of times circumferentially in the form of loops about a generally elongated, narrow-diametered core axis (e.g. a long cylindrical tube) and then back again. The pattern of winding shown in FIG. 6 of my U.S. Pat. No. 3,730,794 and FIG. 1 of my U.S. Pat. No. 3,730,244, may be more practical however and is the winding pattern preferred for use herein to produce the porous body 10 of the inventive ring-insert herein. As compared to the winding patterns shown in FIGS. 1 and 5 of my U.S. Pat. Nos. 3,730,794 and 3,568,286 aforedescribed, in such preferred winding pattern shown in FIG. 1 of U.S. Pat. No. 3,730,244 and FIG. 6 of U.S. Pat. No. 3,730,794, the coated filament does not initially make a series of complete circumferential loops about the axis of the small diametered core and then back again, but rather makes a number of traverses in a "zig-zag" fashion at a contant angle to the core until a complete circumferential loop around the core is made. By winding in this "zig-zag" fashion a number of circumferential times, a multi-diamond pattern can be made out as shown. Taking the starting diameter of the rim or core upon which the winding is to be done into consideration, a "zig-zag" winding pattern can be pre-calculated which will give an identical number of even-sized multi-diamonds circumferentially about the rim or core, which importantly distributes the weight of the wound mass more uniformly about the rim or core. Once the even "multi-diamond" pattern is established, any desired thickness of the layers of diamonds can be built-up by winding directly over the underlying filamentary pattern of diamonds as shown in FIG. 5 of U.S. Pat. No. 3,730,244. In any event, all of the methods and patterns of winding shown in my earlier aforementioned U.S. Patents lead to a volume-compressible, porous body 10 of elastomer-coated filaments having voids 13 therein wherein the filaments contact one another substantially only at their crossover points.

Instead of winding with a single strand of filamentary material, a number of filaments may be applied to the core at the same time. For example, two filaments may be started, either at opposite ends of the core or at the center and wound on opposite directions at the same angle.

The elastomeric binder is applied to the filamentary material prior to winding, for example by passing the filamentary material through a solvent solution or aqueous latex containing the binder or binder composition, or by extruding a layer of the binder upon the filament using conventional extrusion techniques, e.g. passing the filament having a binder coating thereon through a die. Extrusion coating through a die is preferred since an even coating is applied in this manner.

An elastomeric binder is suitable for use in bonding the filamentary material herein. Preferably the binder is curable or vulcanizable, for example curable or vulcanizable natural or synthetic rubber. After winding, the uncured binder is cured or vulcanized to improve adhesion particularly of binder to binder and/or to achieve or improve elastomeric properties and/or to increase modulus of the binder. As examples of such elastomers, mention may be made of synthetic rubbers such as nitrile rubber, neoprene, natural rubber and butadiene/sytrene rubbers. Small amounts of conventional additives such as vulcanizing or curing agents, antioxidants, adhesion promoters, softeners, organic accelerators, etc. can be included in the elastomeric binder composition.

At least sufficient binder material should be present to permit flow of the binder into the voids thus obtaining the desired deflection in the insert. At least about 75 percent by weight of elastomeric binder based on the weight of filaments is employed in the porous ring 10. Preferably at least 3 parts by weight, for example greater than 10 parts by weight, of elastomer binder are employed for each part by weight of filamentary material in the run-flat ring inserts of the invention.

The terms "filament" and "filamentary material" as used herein are intended to refer to an individual continuous fiber, or a plurality of fibers formed into a continuous strand, cords, yarns, and threads. Preferably, the filamentary material employed in the porous ring 10 comprises a strand which has been treated by means known to the art to minimize any abrasion on the strand and/or increase adhesion to the binder during fabrication of the insert e.g. by a polymeric coating such as polyvinyl chloride, plastisol or neoprene.

The filaments which can be employed in the porous ring 10 include both natural and synthetic fibers such as glass, modacrylic (DYNEL), polyester (DACRON), polyethylene, polypropylene, polyvinylidene chloride, fluorocarbon, rayon, polyamide, such as nylon and aramid, acrylic, cotton, wool, graphite, boron, etc. The particular fiber employed in the porous portion 10 is selected with the end use of the insert in mind. For example, glass is a preferred filamentary material where complete elastic recovery at substantially all loads and temperatures is desired. Where relatively low loads are to be employed or if elastic recovery is not a major factor in the use of the insert, other materials may be employed. For example, DYNEL, which has 100 percent elastic recovery at 2 percent elongation could be selected for relatively low load operations. A preferred glass filament is a continuous filament glass yarn, prepared by twisting and/or plying a number of fiberglass fibers. A polymeric coating is applied to the yarn to make the glass non-friable and to improve adherence to the coating.

Another preferred filamentary material for use in the compressible porous ring 10 is prepared from aromatic polyamides or aramids. KEVLAR, (a trademark of DuPont de Nemours, E. I. & Co.) which is an aromatic polyamide fiber possessing high tensile strength said to have greater resistance to elongation than steel and used in radial tires, is a preferred filamentary material when such properties are desired.

The use of filamentary material which shrinks upon heating may also be desirable in the compressible porous ring 10 in certain instances. It has been found that by winding a porous element in the above fashion with an elastomer coated shrinkable nylon cord (DuPont 1260/5/3) having a high modulus and thereafter heating the wound body, the compression modulus of the body is greatly increased as compared to a wound insert prepared using a non-shrinkable filamentary material such as KEVLAR. This is caused by tightening the filament and consolidating the insert.

The filaments 11 should be substantially covered by the binder 12 or have a sufficient uniformity of pattern of deposited binder to give a uniform compression profile under load.

To provide, for example, extra cushion, the elastomeric binder material 12 can be caused to foam utilizing conventional methods. Any of the well-known foaming agents such as 4,4' oxybisbenzenesulfonyl hydrazide, can be employed in the elastomeric binder to assure foaming of the elastomer. The extent to which the elastomer is foamed can be varied. For instance, foaming may be conducted to the extent that the spaces between the filaments in the wound portion are substantially filled with cellular elastomer, the filaments being connected by a network of elastomer-elastomer bonds. In such a case, the voids in the cellular elastomeric binder permit volume-compression of the material and the elastomer-elastomer bonds in the cellular network provide a high degree of cushion to the insert. Foaming to a lesser extent provides a porous ring wherein the spaces defined by the wound filaments are not entirely filled with wound cellular elastomer and the filaments are covered with a thin layer of the foamed elastomer which likewise provides cushion to the finished insert-ring.

Figure 13:
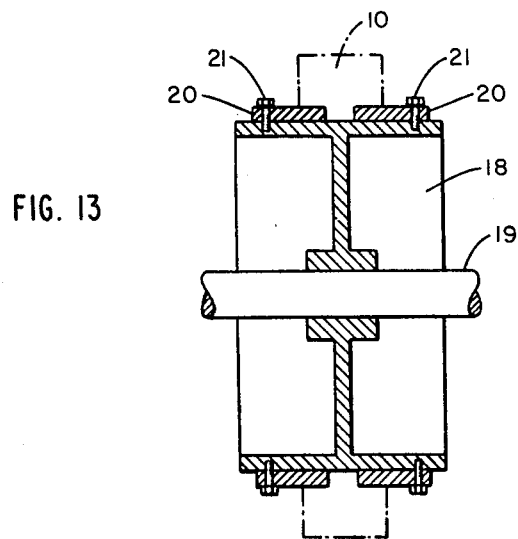
FIG. 13 is a cross-sectional view of a winding drum upon which the insert-rings of FIGS. 1-9 can be made, and in particular the insert-ring design of FIG. 2.

The cores on which the filaments 11 are wound can be steel, rubber, plaster, etc. The core is removed after the filament winding step is complete. The cured elastomer-filament mass is simply slipped off of the core, as mentioned above, and inserted into a conventional vehicle tire carcass or separated from the core by dissolving the core with a substance which is not a solvent for the filament or the elastomeric binder. A collapsible core can also be employed. A preferred core comprises a winding drum as shown in FIG. 13 described in detail below.

Figure 3:
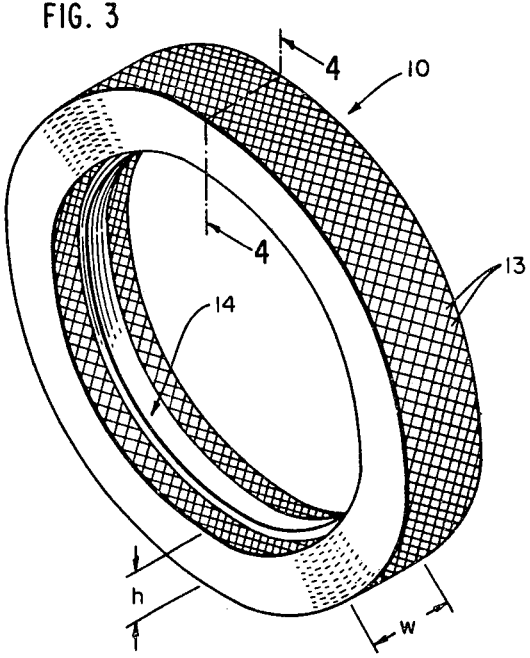
FIG. 3 is a new in perspective of another insert-ring according to the invention.
Figure 4:
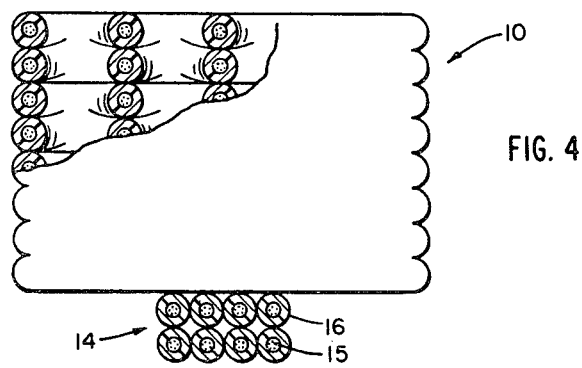
FIG. 4 is a cross-sectional view along the lines 4—4 of FIG. 3.

In FIG. 3, the ring 10 of FIG. 1 has been further provided with a reinforcing member 14 located within the inner diameter of ring 10, the function of which is to prevent the ring 10 from expansion in the radial or circumferential direction. In the construction shown in FIG. 2 the reinforcing member 14 is less extensible in the radial or circumferential direction than 10 and also acts to space and support, at least partially, the ring 10 from the tire rim (see FIG. 11). In the construction of FIG. 3, the reinforcing member 14 is shown as a single enlargement or "bead" bonded to the ring 10. The bead 14 as shown in FIG. 3 has a width substantially less, for example about 20 to 35%, of the width "w", of the compressible porous body 10. In the embodiment shown in FIGS. 3 & 4, the bead 14 is composed of a plurality of circumferentially wound filamentary mterial 15 substantially embedded in a matrix of binder material 16. In constrast to the compressible porous ring 10, the bead filaments 15 are tightly wound, that is are closer togeter than windings in 10 with little spacing between.

By using as the reinforcing member, a member 14 as described in the foregoing paragraph which is non-extensible in the radial or circumferential direction, or at least less extensible in that direction than portion 10, and bonding the bead to porous ring 10, the tendency of ring 10 to expand rapidly upon revolution is diminished as pointed out above.

Optionally, or additionally, the porous ring 10 can be rendered less extensible or expanable upon rotation as when the tire is in operation by placing one or more flexible, non-extensible windings of filamentary material (17 in FIGS. 6 and 8) around the outer circumference of porous portion 10. Individual, spaced, circumferential windings of elastomer binder-coated filament (15 and 16) can be used for such purposes, or a continuous layer formed by winding a single filamentary material (coated or uncoated with binder) helically about the circumference of portion 10 having no space therebetween can be used (not shown).

It is highly preferred and advantageous that binders 12 and 16 be curable or vulcanizable and further compatible so that the two can be fused, adhered, or cured together to form a bonded unitary mass. I have good results in employing a vulcanizable natural rubber composition as the binder components for 12 and 16 which after application and winding can be vulcanized or cured into a well-bonded unitary insert. Alternatively, the member 14 can be separately formed and thereafter adhered to porous ring 10 using suitable adhesives. Also, the bead 14 could be of non-filamentary material, e.g. a plastic or metal ring.

Figure 7:
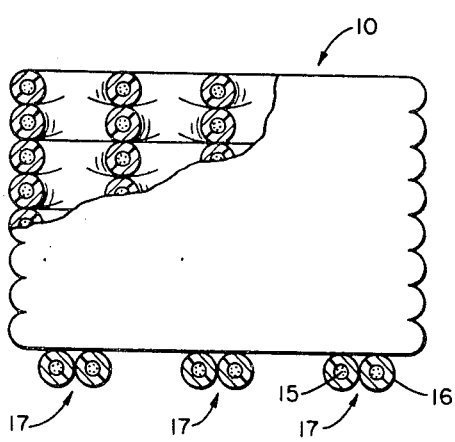
Figure 8:
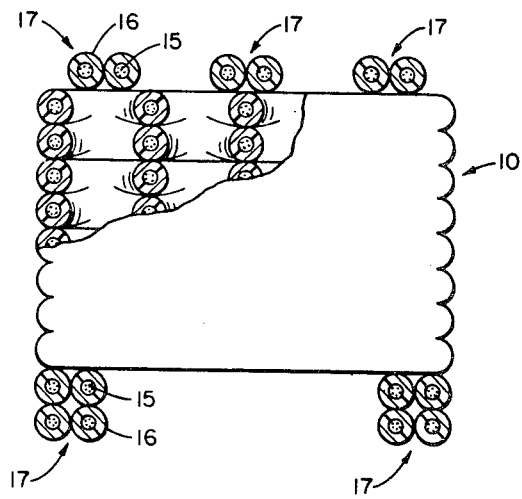

A plurality of non-extensible members 14 can be utilized as shown in the various optional ring-insert designs according to the invention shown in FIGS. 5, 7, and 8. Note that in these Figures the reinforcing members 14 act also to space the ring 10 from the tire rim.

Figure 2:
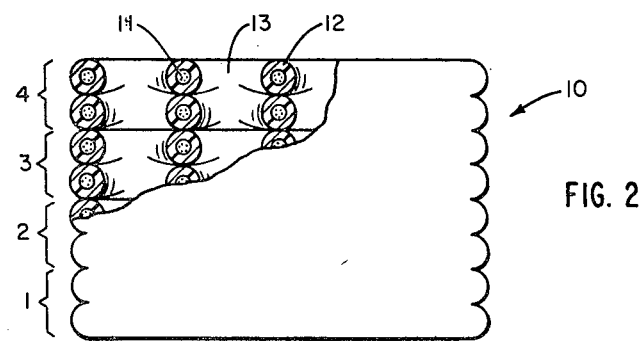
FIG. 2 is a cross-sectional view, partially in perspective, along the lines 2—2 of FIG. 1.

In FIG. 13, a winding drum for producing the ring-inserts of FIGS. 1 and 2 is shown. A hollow metal drum 18 having a rounded exterior surface is rotated by axel 19. A ring having no bead 14 formed integrally therewith could be wound directly upon the smooth rounded surface of this drum. However, in order to provide a depression into which the coated filaments 15 of bead 14 can be wound in order to produce 14, two removable circular flanges 20 are bolted via bolts 21 to the surface of winding drum 18. Uncured elastomer-coated filamentary material 15 is first closely and tightly wound into the depression formed by flanges 20 to the height of flanges 20. Coated filamentary material 15 is then wound as previously described to form porous ring 10 on top of flanges 20 as shown (10) with bead 14 integral therewith. Bolts 21 are then removed, allowing removal of flanges 20, whereupon the porous ring 10 having bead 14 attached thereto can be removed and bonded integrally by curing the entire compoiste. A similar drum could be fashioned for the insert embodiments shown in FIGS. 5 through 9.

Figure 14:
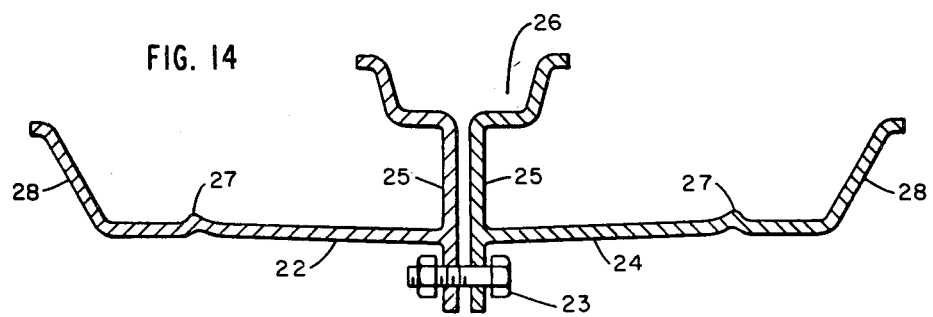
FIG. 14 is a cross-sectional view of a "split-rim" for mounting the insert-ring of FIG. 2.

FIG. 14 shows, in cross section, a two-piece or "split" rim design for mounting the insert of FIG. 2. A first half section 22 bolts via nut-and-bolt arrangement 23 to a second half section 24. Each section has integral therewith raised flanges 25 which when mated form a groove 26 into which bead 14 of ring 10 fits. As is obvious to one skilled in the art, the beads of a conventional tire carcass are held in place in the spaces between beads 27 and flanges 28 of half sections 22 and 24.

Figure 10:
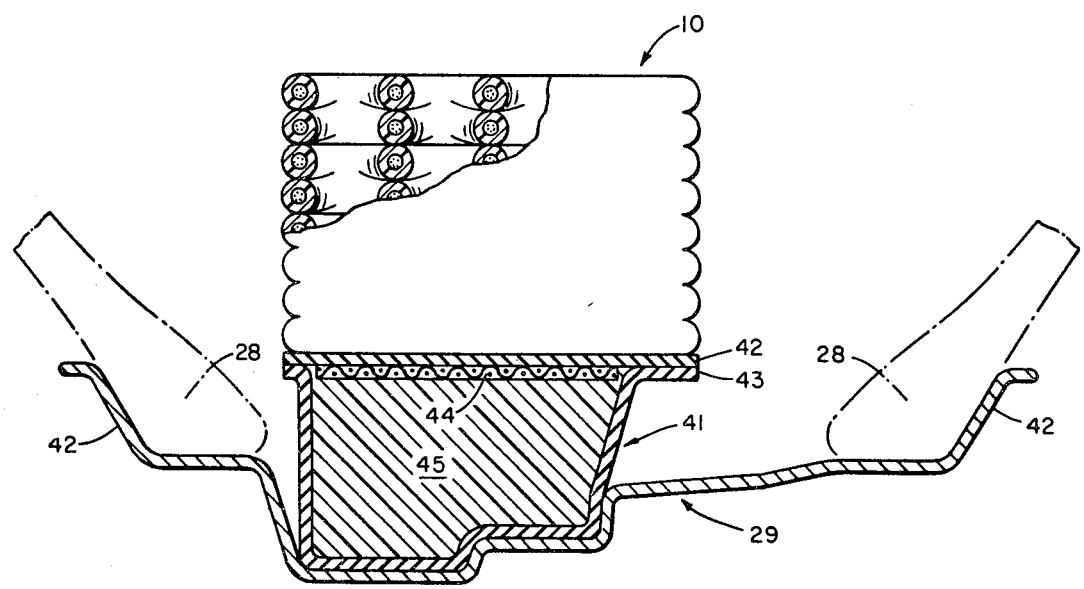
FIG. 10 is a cross-sectional view of the design shown in FIG. 9 mounted upon a conventional "one piece" tire rim and within a conventional pneumatic tire carcass.
Figure 11:
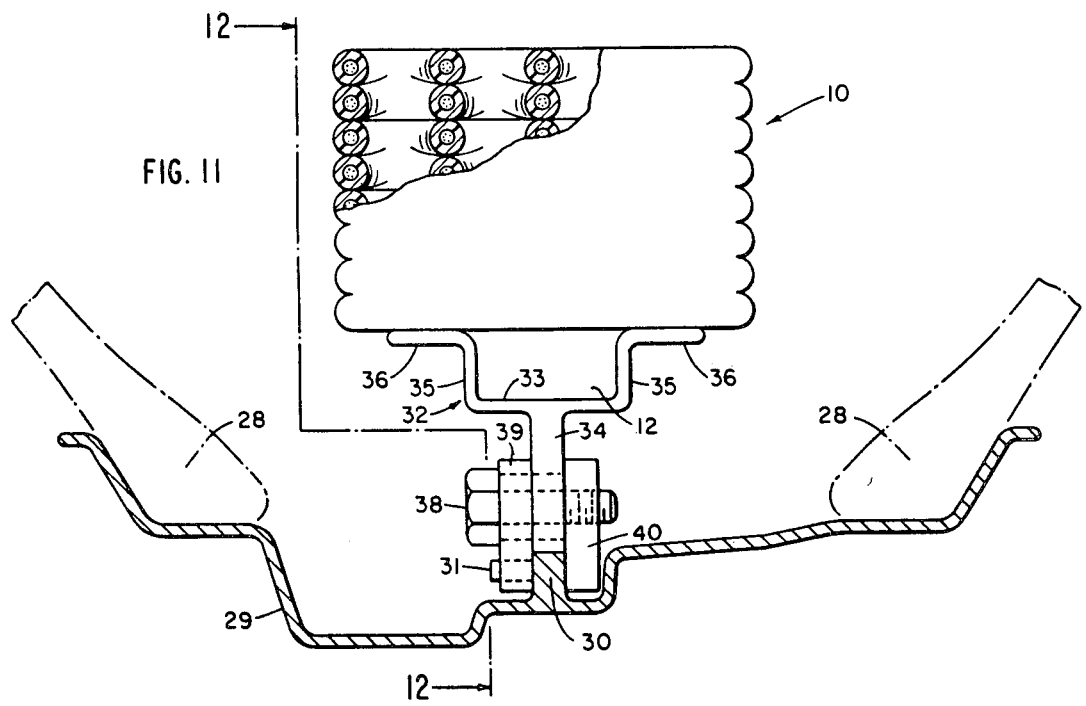
FIG. 11 is a cross-sectional view of the insert-ring of FIG. 2 upon a metallic spacer-member.
Figure 12:
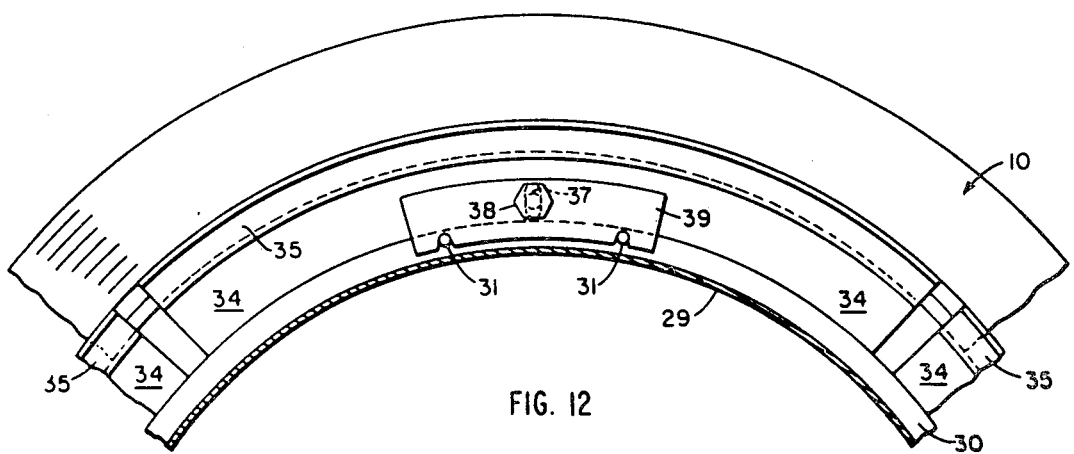
FIG. 12 is a cross-sectional view along the lines 12—12 of FIG. 11.

A somewhat similar mounting arrangement involving a one-piece automobile tire rim is shown in FIGS. 10, 11 and 12. In FIGS. 11 and 12 a conventional one-piece "deep-well" automobile tire rim 29 has been modified to include a raised continuous rib 30 shown integral with rim 29 in FIG. 11, although rib 30 could be simply welded to rim 29. Rib 30 has a pair of bosses 31 integral therewith. Although not shown rib 30 has four such pairs of bosses equally spaced about the circumference of rib 30. A generally "T" shaped shoe 32 comprised of platform 33 and leg 34 is adapted to receive insert 10. Bead 12 rests upon platform 33. Upstanding side portions 35 of platform 33 form a channel to contain bead 14. Extensions 36 of side portions 35 provide additional support to porous ring 10 and also prevent the sides 35 from cutting into porous ring 10 when the tire is running in the run-flat position. The lower leg portion 34 of shoe 32 rests on rib 30. The lower leg portion 34 has an elongated or oval-shaped opening therethrough, 37 in FIG. 12 through which a threaded bolt 38 slides. A metal arm 39, notched to receive bosses 31, cooperates with a like metal arm member 40 to secure the "T" shaped shoe 32 in place. Member 40 has a threaded opening therethrough into which bolt 38 can be screwed in order to hold leg 34 of shoe 32.

As is evident from FIG. 12 "T" shaped shoe 32 is spaced from three other like shoes, (not shown), which all have metal members 39 and 40 and threaded bolts 38 associated therewith in the same manner shown in FIG. 11.

The following is a detailed example of producing an insert-ring as shown in FIG. 2 on the winding drum shown in FIG. 13.

EXAMPLE

A rubber composition was prepared according to the following formulation:

|  | Parts by Weight |
| --- | --- |
| Uncured natural rubber | 100 |
| Antioxidants: (Agerite D) | 1.5 |
| (Flexzone Z) | 1.5 |
| Zinc Oxide | 5 |
| Carbon Black (Cabot 351 C.B.) | 60 |
| Pine tar | 5 |
| Sulfur | 1.2 |
| Stearic Acid | 2.0 |
| Curing agent (Santocure MOR) | 1.8 |
| Cure Retarder (P.V.I.) | 0.4 |
| Curing agent (Sulfan R) | 1.5 |

A ring of the invention as shown in FIG. 2 can be prepared from the above rubber composition as follows. The above rubber composition was coated upon a continuous filament (DuPont 1000 5/3 KEVLAR) by extrusion through a Brabender crosshead extruder fitted with a 0.220 inch diameter nozzle. The coated filament was wound tightly (using a McLean-Anderson W-1 winder) to fill the space on the winding drum shown in FIG. 13 defined by flanges 20. Filling of the space (approx. 1 inch deep and 1 inch wide) produces the bead 14 of the insert of FIG. 2.

Figure 15:
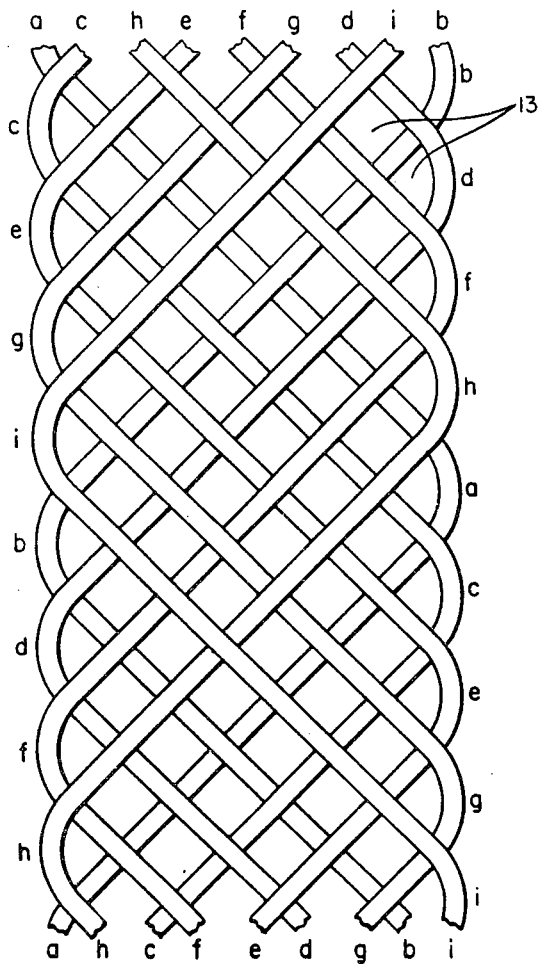
FIG. 15 is an enlarged plan view of the schematic winding pattern shown in FIG. 16 which can be followed to make the insert-rings 10 of FIGS. 1-11.
Figure 16:
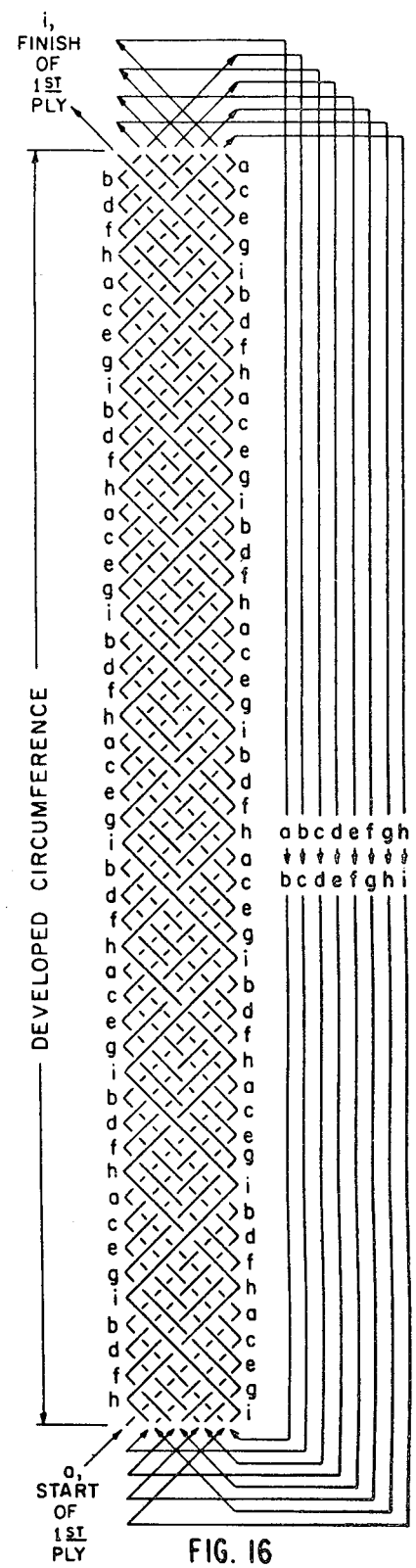
FIG. 16 is a detailed schematic illustration of one pattern of windings which can be followed according to the invention to make the insert-rings 10 shown in FIGS. 1-11.

Next, a continuous length of nylon filament (DuPont 1260/5/3 T 728) was coated with the same rubber composition above using the same crosshead extruder and nozzle (0.220 inch diameter). Using the McLean-Anderson W-1 winding machine, the continuous rubber-coated nylon filament is then wound on the winding drum shown in FIG. 13 to produce the "multi-diamond" pattern of the porous ring portion 10 shown in FIGS. 1-11. The general method of winding employed is the preferred "zig-zag" method previously discussed wherein a number of traverses are made across the winding drum back and forth in a zig-zag fashion before one complete circumferential winding or "loop" is made about the winding drum. FIGS. 15 and 16 illustrate in schematic fashion one such winding pattern pre-calculated to form arbitrarily fifty evenly-configured diamonds about the circumference of the winding drum (and correspondingly about the circumference of the porous ring portion 10), and having four (more accurately approximately three and one-half)

diamonds across its width (i.e. across the width "w" shown in FIGS. 1 and 2.)

Referring to FIG. 16 the initial winding of the rubber-coated nylon filament prepared above is started on the winding drum (40 inch circumference) at point "a", the start of the first ply. This winding then proceeds at a constant angle to the axis of the winding drum across and back in zig-zag fashion. After five and one-half "back-and-forth" strokes (i.e. counting a traverse to the right and return to the left as one "stroke") the guide of the filament winding apparatus is 0.4 inch short of completing one revolution of the winding drum, and ends on the opposite side of the winding drum from the side winding was started (see end of the winding "a" in upper right hand corner of FIG. 16). The winding was at a constant angle to the axis of the winding drum (approximately 45 degrees). The next winding, "b", would end after the same 5½ strokes (and after one revolution of the winding drum) 0.8 inch short of the starting point but on the same side as the start of the winding. After a progression of such windings "a" through "i" shown in FIGS. 2 and 3, an 0.8 inch long (circumferential length) diamond pattern would be formed. This would correspond to 50 "strokes" of the winding guide. At this point the pattern shown in FIGS. 15 and 16 on the 40" drum would be completed and the 51st stroke would fall directly over but not touching the start of the winding ("a"). This completed pattern of windings results in one "ply" of evenly-dimensioned multi-diamonds. By "evenly-dimensioned" it should be understood that the diamonds are "evenly-dimensioned" with the tolerances of the winding apparatus, and even though the diamonds are pre-calculated to be even, the inherent limitations of any mechanical winding apparatus dictate the extent to which all of the diamonds are perfectly even.

Once the multi-diamond pattern aforedescribed and depicted in FIGS. 15 and 16 has been wound in a single "ply" as shown, as many plies of the same pattern can be "built-up" thereover by winding directly over the underlying filament until the desired height ("h" in FIG. 1) is reached. The cross-sectional view shown in FIG. 2 of the ring 10 assumes the ring to have been made in accordance with the particular pattern just described in the foregoing "Example", and four "plies", numbered 1-4 in FIG. 2 having been built-up upon the winding drum, the coated filaments in plies 2 through 4 lying directly over the underlying filaments in the adjacent ply or layer and being in the same pattern. As a consequence, diamond-shaped openings 13 extend through the overall height "h" of the ring 10.

While a metal "T" shaped member (in cross-section) is shown to space and support ring 10 in FIGS. 11, 12 and 14, the ring 10 can be spaced and supported (or "cantilevered") by members having other cross-sectional configurations which likewise have a cross-sectional mass per unit volume less than that of ring 10 in order to reduce the overall weight added to the tire. For example, members having in cross-section configurations such as "⅔", "X" or "O" can be employed to space and support ring 10 on the tire rim. Moreover such members could be comprised of materials other than metal, for example polymeric materials, even foamed polymeric materials to reduce weight.

The spacer support member interposed between the ring 10 and the rim may comprise a thin strong tube formed to fit into the "drop-center" or well portion of a conventional "one-piece" automobile tire rim, which tube is thereafter caused to expand in volume. Such tube further has a "neck" which is made to extend out through the valve stem hole or other opening in the rim. The tire with the insert ring 10 in place is mounted upon the rim. When the ring 10 is properly positioned, a liquid curable polymer for example is forced into the tube via the "neck" under high pressure and cured in place. The cured polymer may be sufficiently hard or rigid to hold the ring 10 in proper position under running conditions. The tube may be composed of polyethylene terephthalate ("Mylar") or other strong material, and may have a wall thickness of only a few thousandths of an inch so as to not interfere with tire mounting. The liquid curable polymer may be for example a polyurethane, epoxy or other firm-curing polymer.

Figure 9:
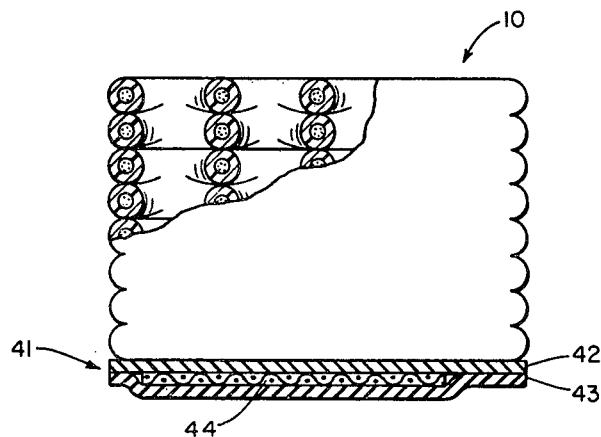

In another embodiment shown in FIG. 9, the spacer support member comprises a thin expandable tube of rubber 41, also designed to fit into the well of the rim, and bonded to the inner circumference of the ring 10. Thus referring to FIG. 9, a first circumferential ring-shaped layer or strip of uncured rubber 43 is superposed by a like circumferential layer or strip 42, with a continuous circumferential ring-shaped layer or strip of non-adherent material 44 sandwiched therebetween. Material 44 is spaced from the edges of strips 42 and 43 and is completely encapsulated therebetween, except for a small hollow inlet tube or "neck", e.g. a tube of uncured rubber (not shown) extending from the fabric layer a distance outside of and beyond the edges of 42 and 43. Material 44 is non-adhering to the rubber layers 42 and 43 after such have been cured or vulcanized; for example a strip of Holland cloth may be used for material 44. Subsequent curing or vulcanization of rubber layers 42 and 43 bonds the two together except for the area separated by strip 44 and the inlet tube, forming a rubber tube or envelope expandable by the admission of material to the interior thereof via the inlet tube. In the embodiment shown in FIG. 9, the cross-sectional width of the strip 44 is made to correspond approximately to the cross-sectional width of the well or recessed portion of a conventional "drop-center" rim shown in FIG. 10.

The rubber tube or envelope 41 may be adhered if desired to the inner circumference of ring 10 as shown, using e.g. a suitable adhesive. Preferably the construction shown in FIG. 9 is made by encircling a winding drum (such as shown in FIG. 13 with flanges 20 removed) with a continuous flat strip 43 of uncured rubber compound, placing a continuous circumferential strip of Holland cloth 44 around and in contact with strip 43, and thereafter superposing both with a strip of uncured rubber 42 in the arrangement shown in FIG. 9 (after insertion of the aforementioned inlet tube, not shown). Thereafter, elastomer coated filaments 11 are wound upon layer 42 in the aforedescribed manner to build-up ring 10 upon the winding drum. The wound material along with tube 41 are then removed and cured or vulcanized together producing adherent bonds between the edges of 42 and 43, and between the upper surface of 42 and the inner circumference of ring 10 at points of contact therebetween.

After positioning of the ring design shown in FIG. 9 within a conventional tire carcass and mounting of such upon a rim, the tube 41 is filled with a curable liquid or semi-liquid polymer 45, for example of the type aforementioned, via the aforementioned inlet tube, to expand tube 41 substantially into the well area of the rim as shown in FIG. 10. The polymer 45 is thereafter cured or otherwise caused to harden or rigidify.

It will be obvious to one skilled in the art that any elastomeric material in addition to rubber may be used for strips 42 and 43 which form the walls of tube 41. Further, strips 42 and 43 may be of different material, for example different elastomeric substances. Also, it is obvious that only strip 43 need be elastomeric in order for the tube 41 to be expandable, and thus strip 42 may be of non-elastomeric material. It is desirable and preferable however that the tube 41 be flexible in order to permit its mounting within the tire.

It will be further obvious to one skilled in the art that fluid materials other than liquid curable polymer 45 can be used to expand tube 41 after mounting in the tire and placement upon the rim.

It is preferable that some means be provided to reduce the friction between porous ring portion 10 and the interior of the tire carcass containing it when the tire is deflated and the wheel is operating in the run-flat condition. Thus means for dispensing lubricant, e.g. glycol, graphite and stearate soap lubricants known for this purpose can be included, or the outer exterior of portion 10, (or the interior of the tire) can be coated with a material having a low coefficient of friction, e.g. TEFLON, a trademark of DuPont.

The porous ring-insert of the invention has been found to possess such excellent load distribution properties that even though it is only supported by the narrow bead portion 14 in the run-flat condition, the weight of the vehicle is distributed over the entire surface of the porous ring 10. This has been proven by Applicant in tests wherein "foot prints" were taken of an insert of the type shown in FIG. 3 in contact with carbon paper using an Instron compression device exerting a load of 1000 pounds. The "foot prints" obtained with the insert were essentially identical with those obtained testing a porous portion 10 whose entire width ("w" in FIG. 1) was supported by a solid metal rim as opposed to being supported simply by bead 14.

The ability of porous ring 10 made in my novel manner to exhibit good load distributing properties even when spaced and supported by e.g. only a narrow bead 14, is surprising and believed due to the uniqueness of the fiber elastomer-void space network as a run-flat insert ring. This unexpectedly good load distribution property allows a run-flat insert construction such as in any of the attached drawings to be made wherein the total mass of ring 10 and the spacer-support member is less than would be found in a comparative construction wherein ring 10 is made to extend all the way to the rim portion. The result is that the total weight added to the tire by the run-flat design can be minimized and the amount of heat build-up in the tire is also reduced by the use of such support-spacer members having a lower cross-sectional area per unit volume than ring 10. By "support-spacer members having a lower cross-sectional area per unit volume than ring 10" is meant that the support-spacer member is lighter than the ring as determined as follows; if one takes a cross-section through the entire insert design (ring 10 plus the support-spacer means between the ring and the tire rim) of constant thickness in the circumferential direction, then the weight per unit area of "total-supporting space" (defined as the area subtended from the outer width of the ring) is less than the weight per unit area of the ring.

It is claimed:

1. A run-flat tire assembly comprising (a) a pneumatic vehicle tire; (b) a supporting rim for said tire; (c) a flexible compressible ring located within said tire comprised of a plurality of successively wound circumferential layers of elastomer coated filamentary material, said filamentary material having void spaces therebetween and being bonded together at point of contact thereof; and (d) a spacer-support member comprising a tube located between said rim and said ring and acting to space said ring from said rim and to support it when said tire is operating in a run-flat conditions, said tube having been expanded in volume after insertion in said tire by introduction thereto of a fluid material which subsequently is caused to harden into a solidified mass after introduction into said tube.

2. The assembly of claim 1 wherein said ring has additional means associated therewith to reduce its expansion in the circumferential direction when the tire is in rotating operational condition.

3. The assembly of claim 1 wherein said means is less extensible than said ring in the circumferential direction.

4. The assembly of claim 2 wherein said means comprises a reinforcing element less extensible than said ring in the circumferential direction and extends about the inner or outer circumference of said ring.

5. The assembly of claim 4 wherein said reinforcing element is bonded to said ring.

6. The assembly of claim 4 wherein said element extends about the inner circumference of said ring.

7. The assembly of claim 4 wherein said element extends about the outer circumference of said ring.

8. The assembly of claim 4 wherein said reinforcing means comprises at least one circumferential ring of filamentary material.

9. The assembly of claim 8 wherein said filamentary material is coated with elastomer.

10. The assembly of claim 9 wherein a plurality of said rings of elastomer-coated filamentary material are employed and consolidated together into a unitary mass in the form of a continuous bead.

11. The assembly of claim 10 wherein two such beads are employed, each being spaced from one another, one each being positioned at the outer edges of said compressible ring of elastomer coated filamentary material.

12. The assembly of claim 1 wherein at least the inner circumferential surface of said ring has a contour adapted to engage said spacer-support member.

13. The assembly of claim 12 wherein said inner surface has at least one raised portion in the form of a continuous circumferential bead.

14. The assembly of claim 4 wherein said reinforcing element extends about the inner circumference of said ring and comprises a flexible yet non-extensible mass adapted to engage said spacer-support member.

15. The assembly of claim 14 wherein said element contains filamentary material for reinforcing thereof.

16. The assembly of claim 15 wherein said filamentary material comprises a dense compacted mass of circumferential windings of elastomer-coated filamentary material.

17. The assembly of claim 1 wherein said flexible, compressible ring is made by successively winding a continuous elastomer binder coated filamentary material upon a winding drum at an angle to the horizontal axis of said drum and in a manner such that void spaces are created and maintained between the coated filaments so wound, and thereafter the wound mass is removed from said drum.

18. The assembly of claim 17 wherein said elastomer is a curable material and is in an uncured state during said winding, and is thereafter cured following said winding.

19. The assembly of claim 1 wherein said flexible compressible ring is produced by winding an elastomer-binder coated filamentary material upon a winding drum at an angle to the horizontal axis of the drum in a repeated manner to form a predetermined pattern of such windings about said drum, and thereafter the winding is continuous in the same pattern to build up successive layers of windings to a desired thickness.

20. The assembly of claim 19 wherein said pattern comprises a plurality of substantially even-dimensioned circumferential diamond-shaped voids.

21. The assembly of claim 17 wherein said filamentary material is glass yarn or nylon.

22. The assembly of claim 17 wherein said coated, wound, bonded filaments are in contact only in cross-over points.

23. The assembly of claim 17 wherein said filamentary material is wound on said drum at an angle between substantially perpendicular and 60° to said axis.

24. The assembly of claim 17 wherein at least about 75 percent by weight, based on the weight of said filamentary material, of said binder is employed.

25. The assembly of claim 17 wherein the filamentary material is wound at an angle to the axis of said drum ranging between about 30 and 60 degrees.

26. The assembly of claim 4 wherein said reinforcing member comprises at least one circumferential winding of elastomer-coated filamentary material positioned around and bonded to the inner-circumference of said ring.

27. The assembly of claim 26 wherein said reinforcing member comprises a plurality of said windings and gives said inner diameter a surface configuration adapted to conform to said spacer-support member.

28. The assembly of claim 27 wherein said surface configuration is in the form of one or more flexible raised portions.

29. The assembly of claim 1 wherein said rim comprises a split rim having first and second engaging portions separable from each other.

30. The assembly of claim 1 wherein said rim is a unitary rim having a recess therein.

31. The assembly of claim 1 wherein said rim has a recess therein in which said tube is located.

32. The assembly of claim 1 wherein said fluid is a liquid or semi-liquid curable polymer.

33. The assembly of claim 32 wherein said polymer comprises a polyurethane or an epoxy material.

34. The assembly of claim 1 wherein said tube is flexible and is comprised of an elastomeric material.

35. The assembly of claim 34 wherein said elastomer is rubber.

* * * * *